United States Patent [19]
Karabedian

[11] 3,835,209
[45] Sept. 10, 1974

[54] PROCESS OF EXTRUDING A FOAMED EXTRUDATE AND CONTROLLING THE THICKNESS THEREOF

[75] Inventor: James A. Karabedian, Garden City, N.Y.

[73] Assignee: Owens-Illinois, Inc., Toledo, Ohio

[22] Filed: Nov. 9, 1971

[21] Appl. No.: 197,131

[52] U.S. Cl................. 264/51, 264/40, 264/95, 264/101, 264/237, 425/384, 425/387 R
[51] Int. Cl.... B29c 25/00, B29d 27/00, B29d 23/04
[58] Field of Search......... 264/48, 321, 51, 53, 237, 264/348, 95, 51, 53, 237, 209, 40, 101; 425/384, 387 R

[56] References Cited
UNITED STATES PATENTS

| | | | |
|---|---|---|---|
| 2,461,630 | 2/1949 | Cozzo | 264/237 UX |
| 2,529,897 | 11/1950 | Bailey et al. | 264/95 |
| 2,544,044 | 3/1951 | Reber et al. | 264/95 |
| 2,922,194 | 1/1960 | Lampard et al. | 264/95 X |
| 3,194,864 | 7/1965 | Richie | 264/53 X |
| 3,274,317 | 9/1966 | Batosti et al. | 264/95 |
| 3,278,663 | 10/1966 | Graham | 264/95 |
| 3,284,552 | 11/1966 | Haley | 264/95 X |
| 3,299,192 | 1/1967 | Lax | 264/48 |
| 3,311,681 | 3/1967 | Cherney et al. | 264/53 X |
| 3,341,388 | 9/1967 | Bunyea | 264/40 X |
| 3,363,034 | 1/1968 | Noland | 264/48 |
| 3,391,051 | 7/1968 | Ehrenfrennd | 264/48 X |
| 3,426,111 | 2/1969 | Simpson | 264/51 X |
| 3,525,125 | 8/1970 | Berger | 264/48 |
| 3,539,666 | 11/1970 | Schirmer | 264/51 |
| 3,560,600 | 2/1971 | Gliniecki | 264/48 |
| 3,754,067 | 7/1973 | St. Eve et al. | 264/237 X |

FOREIGN PATENTS OR APPLICATIONS

| | | | |
|---|---|---|---|
| 981,736 | 1/1965 | Great Britain | 264/95 |

OTHER PUBLICATIONS

Collins, F. H. "Controlled Density Polystyrene Foam Extrusion." In SPE Journal, July 1960, pp. 705–709.
Whittington, Lloyd R. "Whittington's Dictionary of Plastics." Stamford, Conn., Technomic, 1968, pp. 179–180.

*Primary Examiner*—Philip E. Anderson
*Attorney, Agent, or Firm*—Brooks Haidt & Haffner

[57] ABSTRACT

Caliper in the cross direction of webs of extruded foam plastic produced by longitudinal slitting of a tubular extrusion is controlled by differentially cooling the extrusion circumferentially about its axis as it is extruded. This can be accomplished by locating a plurality of independently controllable air cooling ducts around and following the die orifice.

6 Claims, 4 Drawing Figures

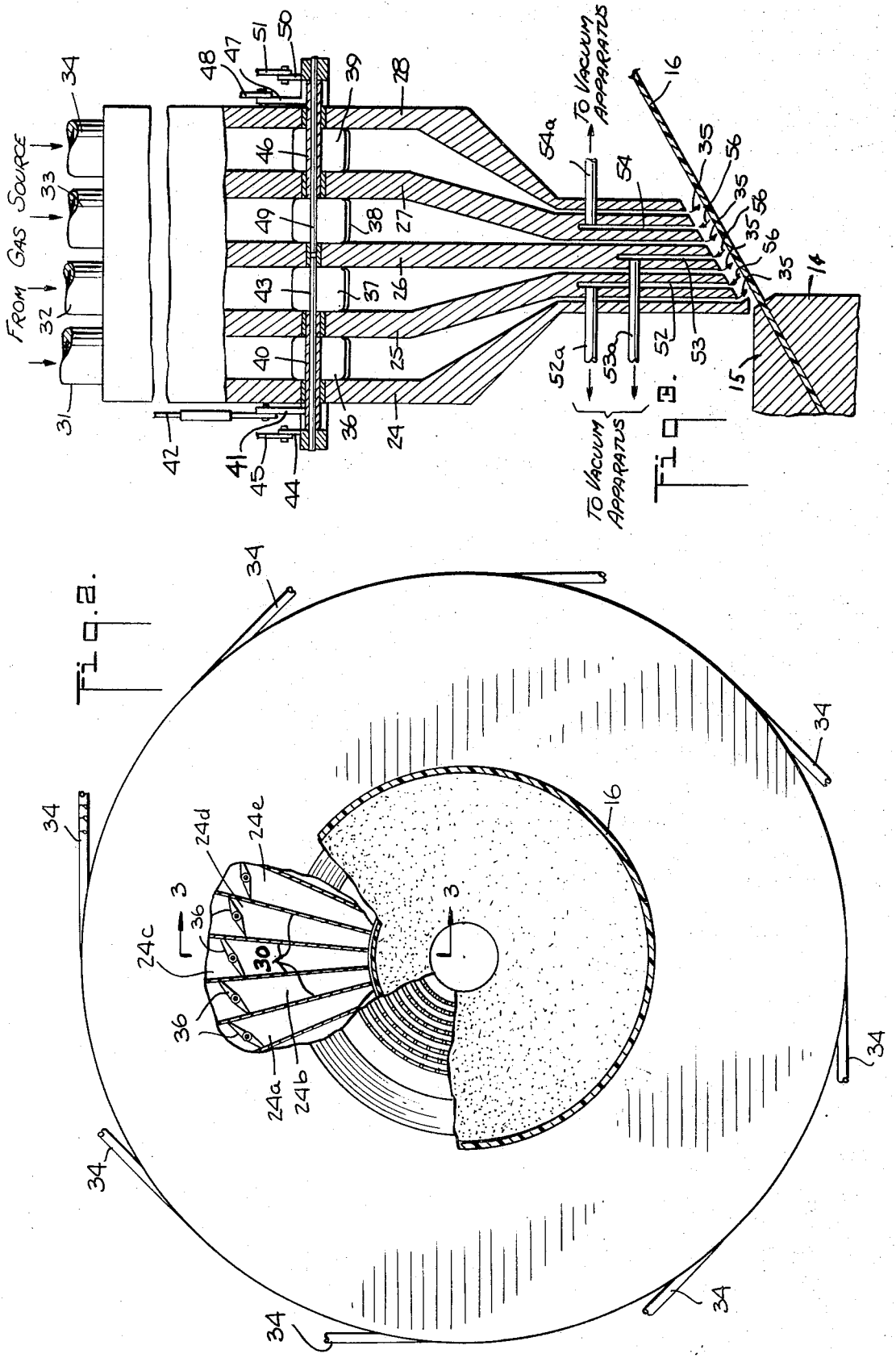

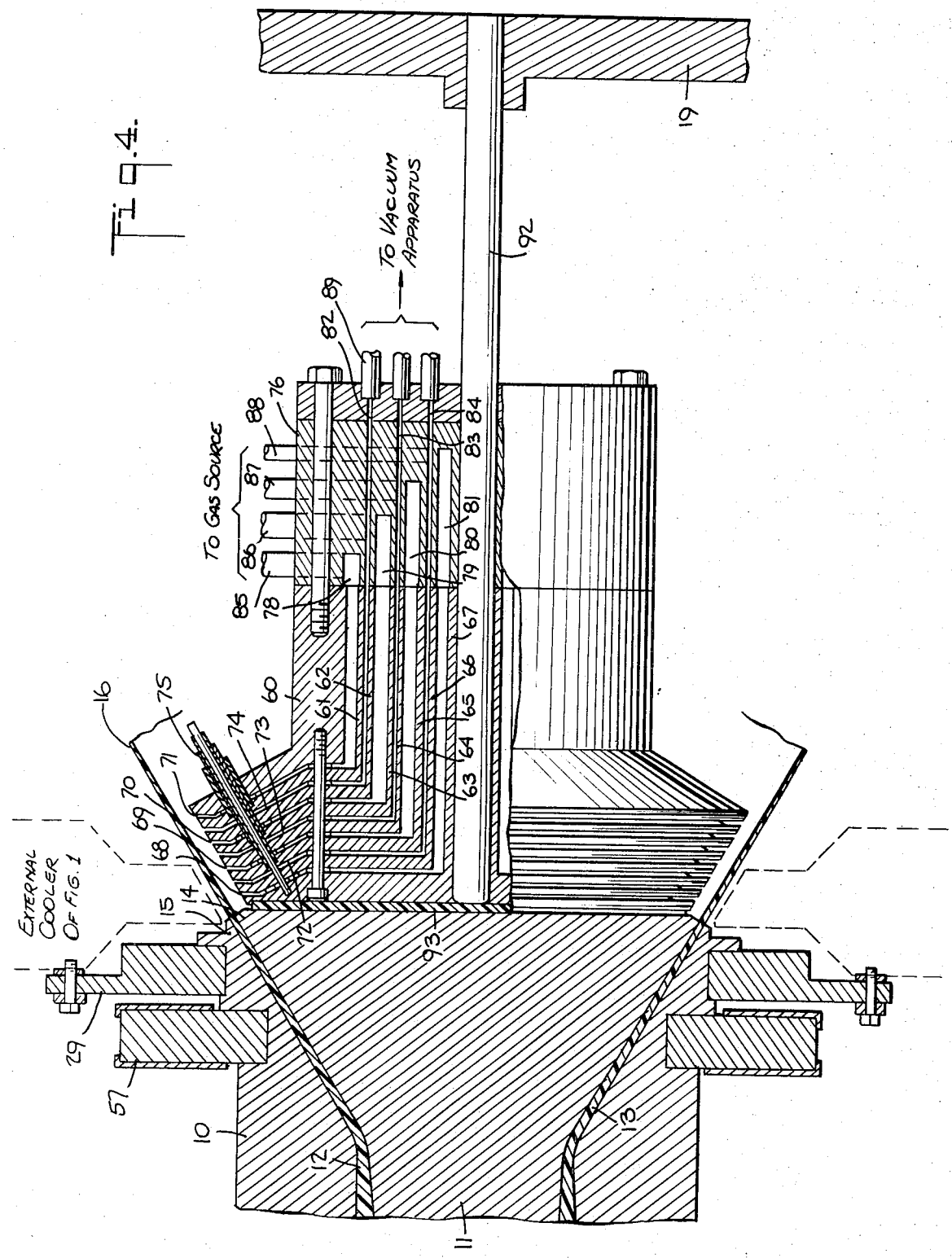

PROCESS OF EXTRUDING A FOAMED EXTRUDATE AND CONTROLLING THE THICKNESS THEREOF

The invention relates to the control of the thickness, or caliper, of extruded foam sheet formed by the extrusion of heated thermoplastic material containing a foaming agent through a die orifice.

The manufacture of foam sheet by the extrusion of a heated mixture of a thermoplastic resin and a foaming agent through a die orifice is well known in the art. In such processes, whether the orifice is rectilinear or circular, the mixture is forced by a heated extruder through a heated die body which has a die slot leading to the orifice from which the foam sheet emerges. After the sheet leaves the orifice, it is cooled, pulled and further processed, such as by slitting, trimming and pressing between rollers.

In such processes, the thickness (caliper) of the resulting sheet is determined mainly by the rate at which the web is pulled away from the die or orifice lips. However, the thickness is also dependent on a number of variables such as the amount of nucleation present, the quantity of foaming or blowing agent, the rate of cooling after the web leaves the orifice lips, the orifice lip spacing, the plastic flow paths in the die, die temperature, etc. While many of these factors are common to the extrusion of thermoplastic without a foaming agent, there are several additional factors involved when the mixture contains a foaming agent.

For example, normally the temperature distribution along the die slot leading to the die orifice is such that the foaming agent forms bubbles in advance of the orifice lips which expand after the web leaves the orifice lips. Thus, the web thickness is dependent on the temperature at the orifice lips and the point and rate of cooling of the web after it leaves the orifice lips. In contrast, since thermoplastic without a foaming agent does not expand at such point, its thickness is little affected by the orifice lip temperature or the point and rate of cooling. Instead, the thickness thereof is determined mainly by the extrusion rate, the orifice lip spacing and the rate at which the web is pulled away from the orifice lips.

When the foam sheet is to be used subsequently for a shrink film, i.e., a film which closely surrounds an object by reason of shrinking resulting from heating of the film after it is placed around the object, the orientation of the molecules of the resin in both the length and width directions of the film is important, and such orientation is also affected by the point and rate of cooling after the web leaves the orifice lips.

It will be apparent, therefore, that both the thickness and properties of a foam sheet are affected by many variables and for certain applications, such as printing of the sheet, it is important to control closely not only the average thickness of the sheet but also the thickness or caliper in a direction widthwise of the sheet. It has been found that conventional methods used with processes for manufacturing thermoplastic sheet without a foaming agent are unsatisfactory for providing the desired control.

However, I have found that the thickness of a foam sheet in the web width direction can be closely controlled with additional desirable results by cooling the web immediately after it leaves the orifice lips with a plurality of controllable gas streams distributed transverse to the direction of extrusion and hence widthwise of the web. The gas streams may be on only one side of the web or on both sides thereof, and while a plurality of such streams in a single plane extending transversely to the direction of movement of the web gives satisfactory results, improved results are obtained with a plurality of gas streams in each of a plurality of such planes disposed, with respect to each other, in the direction of movement of the web. Preferably, gas evacuating or withdrawal ducts are disposed adjacent such streams and the web to increase the gas flow rate.

By means of such gas streams, which may be streams of air, carbon dioxide, or other gases at the desired temperature, i.e., room temperature or a higher or lower temperature but substantially lower than that of the web on which they impinge, individual portions spaced widthwise of the web may be adjusted in thickness. In addition, such gas streams may be used to affect the orientation of the resin molecules and to increase the rate of production.

It has been found that such gas streams apparently affect the amount of expansion of the foaming agent in the portions of the web upon which they impinge and thereby affect the thickness of such portions, the change in thickness being accompanied by a change in density. Thus, if the cooling rate of a portion is increased, its thickness is decreased and its density is increased and vice versa. Tests which have been performed show that a web of polystyrene foam having a thickness of approximately 0.020 inches can be varied in thickness by at least 0.002 inches using air under pressure varying from 1 to 12 ounces per square inch.

One object of the invention is to control the thickness of a thermoplastic foam sheet widthwise thereof.

Another object of the invention is to control the orientation of the resin molecules in a thermoplastic foam sheet.

A further object of the invention is to increase the speed of production of thermoplastic foam sheet.

Other objects and advantages of the invention will be apparent from the following detailed description of presently preferred embodiments thereof, which description should be considered in conjunction with the accompanying drawings in which:

FIG. 2 is an end elevation view, partly broken away, of a portion of the apparatus shown in FIG. 1;

FIG. 3 is an enlarged, fragmentary, cross-sectional, side elevation view of a portion of the apparatus shown in FIGS. 1 and 2, and is taken along the line 3—3 indicated in FIG. 2; and FIG. 4 is a side elevation view, partly in cross-section, of a further embodiment of apparatus for directing gas streams on a tube of foam thermoplastic.

Figure 1:
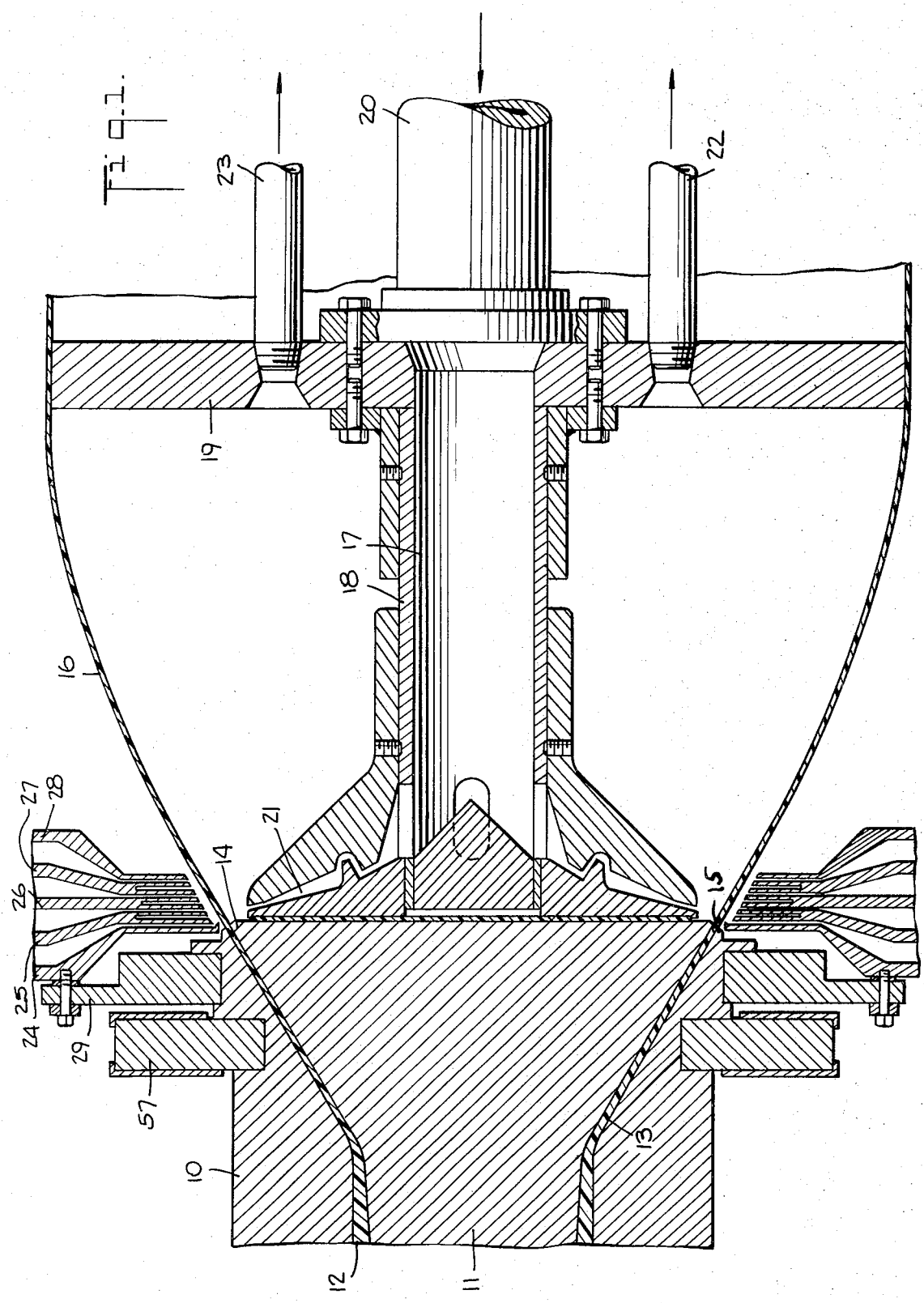
FIG. 1 is a cross-sectional, side elevation view of a portion of an extrusion die and associated apparatus and the apparatus for directing gas streams on a tube of foam thermoplastic.

Although the processes of the invention are applicable to other forms of apparatus, the invention will be described herein in connection with apparatus of the type disclosed in co-pending application Ser. No. 2,005, filed Jan. 12, 1970, now U.S. Pat. No. 3,751,537, in the name of Victor E. Scotto and Maurice W. Blackwelder, and assigned to the assignee to which this application is assigned.

The apparatus illustrated and described in said application, comprises a heated extrusion die having an annular orifice which is supplied with heated thermoplastic containing a foaming agent by a heated extruder. The foam thermoplastic emerges from the orifice as a tube, is pulled by pairs of rollers and is slit into two separate webs or sheets prior to reaching such rollers.

A portion of said extrusion die is shown in FIG. 1 and comprises a main body 10 surrounding a sizing cone or core member 11. The thermoplastic 12, containing a foaming agent, is forced from the left to the right as viewed in FIG. 1 by means of an extruder (not shown), and flows through a conical die slot 13 to the die orifice defined by the lips 14 and 15. The die body 10 is heated by conventional means, such as the ring heater 57, so that the temperature at and immediately in advance of the orifice lips 14 and 15 is such as to cause the foaming of the foaming agent. For example, if the thermoplastic is polystyrene mixed with a foaming agent, the temperature may be of the order of 290°–300°F.

The foaming agent forms bubbles in advance of the orifice lips 14 and 15 which expand as the thermoplastic leaves the orifice lips 14 and 15. The foam thermoplastic forms a tube 16, which is expanded by means of low velocity air flow through the bore 17 of a mandrel 18 which is supported from a sizing disc 19. Air is supplied to the bore 17 of the mandrel 18 through a mandrel supporting pipe 20 and flows outwardly from the bore 17 through a channel 21 having its outlet opening adjacent the lips 14 and 15. Excess air from within the tube 16 is removed by the pipes 22 and 23.

Typical of the thermoplastics which may be used are polystyrenes, styrene copolymers, such as styrene-acrylonitrile and acrylonitrile-butadiene-styrene, polyolefins, such as low and high density polyethylenes, polypropylenes and polyallomers, ethylene copolymers, such as ethylene-vinyl-acetate, polyvinylchloride and cellulosics, such as cellulose-acetate. The foaming agent may be injected into the extruder barrel containing the thermoplastic mixed with a nucleating agent, such as talc, sodium bicarbonate and citric acid or with styrene maleic anhydride. Blowing or foaming agents commonly used for such purposes are pentane and trichlorofluoromethane. Other such agents are neopentane, hexane, isohexane, heptane, isoheptane, dichlorotetrafluoroethane and inert gases such as nitrogen and carbon dioxide.

Alternatively, the thermoplastic may be compounded before extrusion with such nucleating agents and chemical blowing agents which decompose upon the application of sufficient heat during the extrusion process to form bubbles in the mixture. Examples of such chemical blowing agents are azobisformamide, azobisisobutyronitrile, azoaminobenzene, N,N'dimethyl-N-N'dinitroso-teraphthalamide, N,N' dinitrosopentamethylenetetramine, benzene sulfonyl hydrazide, toluene-4-sulfonyl hydrazide, diphenyl-sulfon 3,3' disulfonyl hydrazide, 4,4'-oxybis (benzene sulfonyl hydrazide).

The portion of the apparatus thus far described is conventional in the art, and the means for directing a plurality of gas streams on the tube 16 as it emerges from the die orifice comprises a plurality of disc-like members 24–28, supported from the main die body 10 by a ring 29 secured thereto. The inner periphery of the member 24 is spaced from the lip 15 so as to thermally isolate it therefrom. Gas under pressure is supplied between members 24 and 25, between members 25 and 26, between members 26 and 27 and between members 27 and 28, by the pipes 31–34 (FIGS. 2 and 3), which connect to circumferential manifolds, and the gas impinges upon the exterior surface of the tube 16 as it emerges from the die orifice. The pressure of the gas, and hence, its velocity, is dependent upon the results which it is desired to obtain. For example, if it is desired to reduce the thickness of a portion of the tube 16, and hence, the thickness of a widthwise portion of the resulting web or sheet, the velocity of the gas impinging upon the tube 16 is increased. Generally speaking, the gas supplied to each of the spaces between the members 24–28, will be at the same temperature, but it is, of course, possible to supply gas at different temperatures to the different spaces.

The members 24–28 are shown in greater detail in FIGS. 2 and 3. Each of the spaces between such members 24–28 is divided circumferentially of the tube 16 by a plurality of partitions 30 so as to provide a plurality of circumferentially spaced, enclosed, gas channels 24a, 24b, etc. through which the gas is directed through the open ends thereof upon the exterior surface of the tube 16. The gas which is supplied to said channels by means of pipes 31–34 flows outwardly of the channels and onto the tube 16 as indicated by the arrows 35. The spacing of the partitions 30 is dependent upon the degree of control of the cooling of the tube 16 which is desired and the spacing may, for example, be of the order of 10°. Thus, if the die orifice is approximately eleven inches in diameter, the number of separate channels would be approximately 36, thereby providing individual control of the thickness of 36 separate portions spaced circumferentially of the tube 16, and hence, widthwise of the web which results after slitting of the tube 16, as described in said co-pending application.

The volume of gas passing through each of the channels and impinging upon the tube 16 at the end of the channel is controlled by a plurality of rotatable dampers 36–39. The damper 36 is mounted on a tubular shaft 40, which is controlled by a lever 41 having a linkage 42 connected thereto for rotating the tubular shaft 40 and hence, the damper 36. The damper 37 is mounted on a shaft 43 which is rotatable within the tubular shaft 40 by means of a lever 44 connected to a linkage 45.

Similarly, the damper 39 is mounted on a tubular shaft 46 controlled by a lever 47 on a linkage 48 and the damper 38 is mounted on a rotatable shaft 49 controlled by a lever 50 and a linkage 51. Accordingly, by means of controls of the positions of the dampers 36–39 the velocity and volume of the gas impinging upon the tube 16 at the opening at the end of the channel can be controlled.

For example, if it is desired to reduce the thickness of a portion of the tube 16 adjacent the end of one of the channels controlled by one of the dampers 36, such damper 36 is opened so as to permit a greater volume of gas to impinge on the tube 16 through the channel controlled by the damper 36. Similarly, if it is desired to increase the thickness of such portion, the velocity of gas through the channel is decreased by moving the damper 36 toward the closed position.

Although it is preferred to control the cooling of the tube 16 by controlling the amount of gas directed thereon through the channels 24a, 24b, etc., it is, of course, possible to maintain the gas flow constant and to vary the cooling, and hence, the thickness of the tube 16, by changing the temperature of the gas supplied to a channel corresponding to the portion of the tube 16 which is to be adjusted in thickness. As used herein, the expression "adjusting the gas flowing through a channel" and the expression "adjusting the gas flowing in the gas stream" mean varying either its rate of flow or its temperature or both.

A single pair of members 24 and 25 with an associated damper 36, and dividing partitions 30, is sufficient to give substantial control over the thickness of the tube 16, but additional control thereover is obtained by using the additional members 26–28, and the associated gas channels. However, it is found that the use of the additional members 26–28 is also desirable for control of the orientation of the molecules of the resin for the reasons set forth hereinbefore. Thus, by the use of additional members and channels, additional cooling of the portion of the tube 16 below the surface first cooled by the channels controlled by the damper 36 is provided which permits control of further expansion of the foaming agent after such portion passes beyond the initial channel openings. Such additional cooling controls the size and orientation of the cells, and thus, there is some control of the orientation of the molecules of plastic. Normally, the channel openings adjacent the tube and formed by the members 24–28 will be equal in number and aligned in the direction of extrusion.

The dampers 36–39 may be controlled manually or if desired may be controlled automatically by web thickness measuring apparatus of the type disclosed in said co-pending application.

If gas is merely directed against the tube 16 by the channels between the members 24–28, there is substantial turbulence between the ends of the channels and the tube 16. In addition, the volume of gas which can be directed against the surface of the tube 16 is limited by the velocity at which it can escape through the space between the end of the members 24–28 adjacent the tube 16 and the outer surface of the tube 16. To permit an increase in the velocity and volume of gas which can be directed onto the surface of the tube 16, the members 25–27 preferably are provided with gas withdrawal passageways 52–54 which are connected to a suction device by means of pipes 52a, 53a and 54a so as to withdraw the gas between the inner peripheries of the members 24–28 and the surface of the tube 16, as indicated by the arrows 56. By the use of such means for withdrawing the gas from between the inner peripheries of the members 24–28 and the tube 16, the velocity and volume of gas directed on the tube 16 can be increased, which not only permits greater control of the thickness of the tube 16, but also permits the tube 16 to be withdrawn from the die orifice at a greater rate, because of greater efficiency of cooling. The latter, of course, permits a higher speed of production of the tube 16, and hence of the desired foam web or sheet.

Although not essential, preferably, the passageways 52–54 are divided into gas withdrawal channels corresponding to the channels 24a, 24b, etc. by partitions similar to the partitions 30. The end openings of such gas withdrawal channels adjacent the tube 16 are aligned in the direction of extrusion with the end openings of the gas supply channels between the members 24–28. Preferably, also, such gas withdrawal channels or the lines 52a, 53a and 54a are provided with conventional gas flow controls, such as needle valves, to permit control of the gas flow in each of such channels.

Alternatively, if a lesser degree of control of the web thickness widthwise thereof, i.e., control at more widely spaced portions, is acceptable, the passageways 52–54 may be omitted, and alternate ones of the channels 24a, 24b, etc. may be made gas withdrawal channels. For example, channels 24a, 24c, 24E, etc. may be gas supply channels, and channels 24b, 24d, etc. may be gas withdrawal channels by supplying gas and withdrawing gas therefrom in an obvious manner.

The apparatus shown in FIGS. 1–3 cools the tube 16 externally thereof, but it may be cooled internally by the apparatus shown in FIG. 4. Such apparatus may be used without the external cooling apparatus shown in FIGS. 1–3, or it may be used in conjunction therewith to provide both internal and external cooling. The apparatus in FIG. 4 is similar to that shown in the preceding Figures, but adapted to be mounted internally of the tube 16.

The cooling apparatus shown in FIG. 4 comprises a plurality of concentric members 60–67 having dish-shaped, interfitting end faces and which are spaced from each other so as to provide a plurality of gas passageways 68–71 and a plurality of vacuum passageways 72–74. Each of the gas passageways 68–71 and the vacuum passageways 72–74 are divided by partitions into circumferentially spaced channels in the manner heretofore described, such channels opening radially outwardly and adjacent the interior surface of the thermoplastic tube 16. Each of the gas channels is provided with dampers similar to the dampers 36–39 heretofore described which are controllable by the shaft assembly 75.

A manifold block 76 having a plurality of gas supply manifolds 78–81 and a plurality of vacuum manifolds 82–84 is secured to the ends of the members 60–67. Gas under pressure is supplied to the manifolds 78–81 by means of the pipes 85–88 and flows from such manifolds 78–81 to the gas passageways 68–71. Gas between the interior surface of the tube 16 and the vacuum channel openings is withdrawn through the passageways 72–74, the manifolds 82–84 and the pipes 89–91. The assembly comprising the manifold block 76 and the members 60–67 is supported from the sizing disc 19 by means of a rod 92. The end of the member 67 bears against a disc of thermal insulating material 93, which in turn bears against the core member 11 of the extrusion die.

With the internal cooling apparatus of FIG. 4, cooling gas is directed on the interior surface of the thermoplastic tube 16 as it emerges from the die orifice by the plurality of circumferentially spaced channels in the passageway 68, and is withdrawn from adjacent the interior surface of the tube 16 by means of the passageway 72. Similarly, cooling gas is directed on the interior surface of the tube 16 by the channels in the passageways 69, 70 and 71, and is withdrawn from adjacent the interior surface of the tube 16 by means of the vacuum passageways 73, 74. As with the embodiment shown in the preceding Figures, the thickness of a portion of the tube 16 adjacent to a channel opening may be adjusted by adjusting the gas flowing through the channel corresponding to the opening, an increase in cooling causing a reduction in thickness and a decrease in cooling causing an increase in thickness.

Although the invention has been described in connection with preferred embodiments of the cooling apparatus, it will be apparent to those skilled in the art that various modifications of such apparatus may be made without departing from the principles of the invention.

What is claimed is:

1. In a process for continuously producing a sheet of foam thermoplastic material in which a foamable thermoplastic resin material is plasticated and extruded through the orifice of a heated die, the method for controlling the thickness of said sheet between the outer surfaces thereof and in the direction transverse to the direction of extrusion and hence, across the width thereof which comprises cooling said material by directing a plurality of separately controllable gas streams having a temperature less than that of the extruded material on a surface of said material as it emerges from said orifice and is expanding, said streams being disposed relative to each other in said direction transverse to the direction of extrusion, and increasing the cooling of a portion of said material by the gas stream which impinges on said portion of the material which it is desired to reduce in thickness relative to other portions thereof by adjusting the gas flowing in the gas stream and decreasing the cooling of said portion by said gas stream by adjusting the gas flowing in the gas stream when it is desired to increase the thickness thereof.

2. The method as set forth in claim 1, further comprising additionally cooling said material by directing at least one further plurality of gas streams on a surface of said material, said further plurality of gas streams being disposed relative to each other in said direction transverse to the direction of extrusion and relative to the first-mentioned plurality of gas streams, in the direction of extrusion of said material.

3. The method as set forth in claim 2, further comprising withdrawing gas of said streams by suction from adjacent said material intermediate the first-mentioned plurality of gas streams and said further plurality of gas streams.

4. The method as set forth in claim 2, wherein the number of gas streams in said further plurality thereof is equal to the number of gas streams in the first-mentioned plurality thereof and each gas stream in said further plurality thereof is aligned in said direction of extrusion with a gas stream in said first-mentioned plurality thereof.

5. The method as set forth in claim 1, wherein said orifice is annular and produces an extruded tube of said material and wherein said gas streams are disposed circumferentially of said tube and are directed on the exterior surface thereof.

6. The method as set forth in claim 1, wherein said orifice is annular and produces an extruded tube of said material and wherein said gas streams are disposed circumferentially of said tube and are directed on the interior surface thereof.

* * * * *